(12) United States Patent
Chen et al.

(10) Patent No.: US 9,319,841 B2
(45) Date of Patent: Apr. 19, 2016

(54) LOCATION INFORMATION NOTIFICATION METHOD, USER EQUIPMENT, AND APPLICATION SERVICE GATEWAY

(71) Applicant: HUAWEI TECHNOLOGIES CO., LTD., Shenzhen (CN)

(72) Inventors: Jian Chen, Shanghai (CN); Pinyang Zou, Shanghai (CN); Xian Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 14/061,999

(22) Filed: Oct. 24, 2013

(65) Prior Publication Data
US 2014/0051462 A1    Feb. 20, 2014

Related U.S. Application Data

(63) Continuation of application No. PCT/CN2011/073245, filed on Apr. 25, 2011.

(51) Int. Cl.
*H04W 4/02*     (2009.01)
*H04W 4/00*     (2009.01)
*H04W 64/00*    (2009.01)
*H04W 68/00*    (2009.01)
*H04W 88/16*    (2009.01)

(52) U.S. Cl.
CPC .............. *H04W 4/023* (2013.01); *H04W 4/001* (2013.01); *H04W 4/02* (2013.01); *H04W 64/00* (2013.01); *H04W 68/00* (2013.01); *H04W 88/16* (2013.01)

(58) Field of Classification Search
USPC ........................ 455/414.1, 412.2, 456.1–456.3
See application file for complete search history.

(56) References Cited

U.S. PATENT DOCUMENTS

2003/0118015 A1    6/2003    Gunnarsson et al. ......... 370/389
2010/0120394 A1    5/2010    Mia et al. .................. 455/404.2

FOREIGN PATENT DOCUMENTS

CN    101557575 A    10/2009
CN    101887114 A    11/2010

OTHER PUBLICATIONS

International Search Report issued Feb. 23, 2012 in corresponding International Patent Application No. PCT/CN2011/073245.

*Primary Examiner* — Sam Bhattacharya
(74) *Attorney, Agent, or Firm* — Staas & Halsey LLP

(57) ABSTRACT

The present invention provides a location information notification method, a user equipment, and an application service gateway. The method includes: acquiring, by a user equipment UE, current camping location information through an application programming interface API; performing, by the UE, matching between the current camping location information and a preset location information configuration table; and sending out, by the UE, corresponding prompt information according to a matching result. In addition, a user equipment and an application service gateway are provided.

13 Claims, 3 Drawing Sheets

LOCATION INFORMATION NOTIFICATION METHOD, USER EQUIPMENT, AND APPLICATION SERVICE GATEWAY

CROSS-REFERENCE TO RELATED APPLICATIONS

This application is a continuation of International Application No. PCT/CN2011/073245, filed on Apr. 25, 2011, which is hereby incorporated by reference in its entirety.

TECHNICAL FIELD

The present invention relates to the communications field, and in particular, to a location information notification method, a user equipment, and an application service gateway.

BACKGROUND

A uBro solution is provided in the prior art to meet a requirement for indoor coverage of network signals. In this solution, outdoor coverage is performed by using a macro network, and indoor coverage is performed by a femto (Femto) network, thereby achieving the indoor coverage of the network signals.

In the uBro solution, if a user equipment (UE, User Equipment) used by a user is located indoors, the user equipment may be covered by both the Femto network and the macro network. Because tariffs of using these two networks by the user are different, considering the user's right to know, an operator needs to notify the user of a type of a currently used network thereof.

In the prior art, a location information notification method is mainly implemented by using a mobility management (MM, Mobility Management) information technology or an information technology of general packet radio service (GPRS, General Packet Radio Service) mobility management (GMM, GPRS Mobility Management). A specific process is roughly as follows:

When the UE enters a coverage area of the Femto network from a coverage area of the macro network or enters a coverage area of the macro network from a coverage area of the Femto network, a location area changes, and the UE initiates a location update process to a core network. In the location update process, the core network delivers MM information or GMM information to the UE. After receiving the MM information or the GMM information, the UE reads an identifier of a network on which the UE is currently located therefrom and displays the identifier of the network on a screen of the UE, so that the user is capable of learning the type of the currently used network.

To use the MM information or the GMM information, the UE needs to have an MM information interface or a GMM information interface. Currently, there are various UEs, and application-layer software that they use greatly differs. In a practical application, there is a relatively serious problem in compatibility of the MM information or the GMM information between different UEs.

Inventors of the present invention have performed a compatibility test on mobile phones of each mainstream mobile phone vendor on a current market. The test relates to 29 mobile phones of eight vendors. It can be seen from the test that 31.04% of the mobile phones do not support the MM information or the GMM information at all. In repeated test processes, 6.9% of the mobile phones display the information with probabilities, and 24.13% of the mobile phones have other problems, such as a display delay.

Therefore, in the prior art, the solution in which location information notification is implemented by using the MM information or the GMM information has a poor reliability and cannot accurately and effectively notify the user of location information.

SUMMARY

Embodiments of the present invention provide a location information notification method, a user equipment, and an application service gateway that are capable of accurately and effectively notifying a user of location information.

A location information notification method according to an embodiment of the present invention includes: acquiring, by a user equipment UE, current camping location information of the UE through an application programming interface API; performing, by the UE, matching between the current camping location information and a preset location information configuration table; and sending out, by the UE, corresponding prompt information according to a matching result.

A location information notification method according to an embodiment of the present invention includes: receiving, by an application service gateway ASG, a configuration table acquiring request sent by a user equipment UE; and feeding back, by the ASG, a location information configuration table to the UE, where the location information configuration table is used to indicate a camping location information range of a femto Femto network.

A user equipment according to an embodiment of the present invention includes: a location information acquiring unit, configured to acquire current camping location information of the user equipment UE through an application programming interface API; a matching unit, configured to perform matching between the current camping location information acquired by the location information acquiring unit and a preset location information configuration table; and a prompting unit, configured to send out corresponding prompt information according to a matching result obtained by the matching unit.

An application service gateway according to an embodiment of the present invention includes: a receiving unit, configured to receive a configuration table acquiring request sent by a user equipment UE; and a responding unit, configured to feed back a location information configuration table to the UE, where the location information configuration table is used to indicate a camping location information range of a femto Femto network.

As can be seen from the preceding technical solutions, the embodiments of the present invention have the following advantages:

In the embodiments of the present invention, a UE may acquire current camping location information of the UE through an application programming interface (API, Application Program Interface), and then the UE may determine, according to a matching relationship between the camping location information and a preset location information configuration table, a network on which it is located and send out corresponding prompt information. Almost all UEs having an operating system include an API, and currently, usage specifications and related standard protocols of the API are relatively mature. Therefore, a process of acquiring the camping location information through the API interface is relatively reliable, and various UEs are capable of accurately and effectively notifying a user of location information.

DESCRIPTION OF EMBODIMENTS

Embodiments of the present invention provide a location information notification method, a user equipment, and an application service gateway that are capable of accurately and effectively notifying a user of location information.

Figure 1:
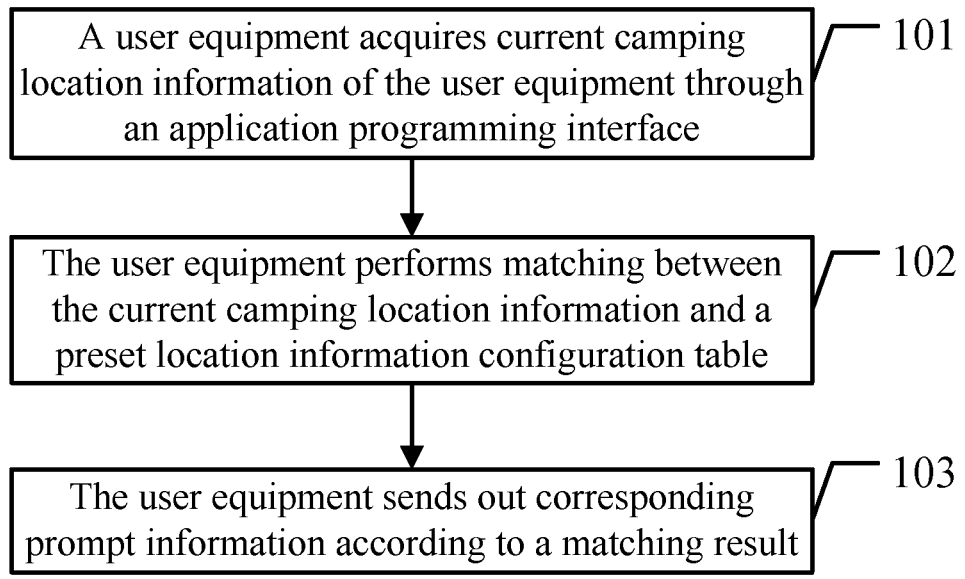
FIG. 1 is a schematic diagram of a location information notification method according to an embodiment of the present invention.

Referring to FIG. 1, a location information notification method according to an embodiment of the present invention includes:

101. A UE acquires current camping location information of the UE through an API.

In this embodiment, when the UE needs to prompt a user with a current camping network, the UE may acquire the current camping location information of the UE through its own API.

It should be noted that in this embodiment, the UE may locally acquire the current camping location information of the UE through the API and may also acquire the current camping location information of the UE from another network-side device through the API.

102. The UE performs matching between the current camping location information and a preset location information configuration table.

After acquiring the current camping location information of the UE, the UE may perform the matching between the camping location information and the preset location information configuration table.

In this embodiment, the preset location information configuration table may be used to indicate a camping location information range of a first network, and the UE may acquire the preset location information configuration table from an application service gateway (ASG, Application Service Gateway).

103. The UE sends out corresponding prompt information according to a matching result.

In this embodiment, after the matching is completed, the UE may send out the corresponding prompt information according to the matching result, which may be specifically as follows:

If the matching succeeds, the UE sends out first prompt information; and if the matching fails, the UE sends out second prompt information; and the first prompt information may be used to indicate that the UE currently camps on the first network, and the second prompt information may be used to indicate that the UE currently camps on a second network.

In this embodiment, a UE may acquire current camping location information of the UE through an API, and then the UE may determine, according to a matching relationship between the camping location information and a preset location information configuration table, a network on which it is located and send out corresponding prompt information. Almost all UEs having an operating system include an API, and currently, usage specifications and related standard protocols of the API are relatively mature. Therefore, a process of acquiring the camping location information through the API interface is relatively reliable, and various UEs are capable of accurately and effectively notifying a user of location information.

Figure 2:
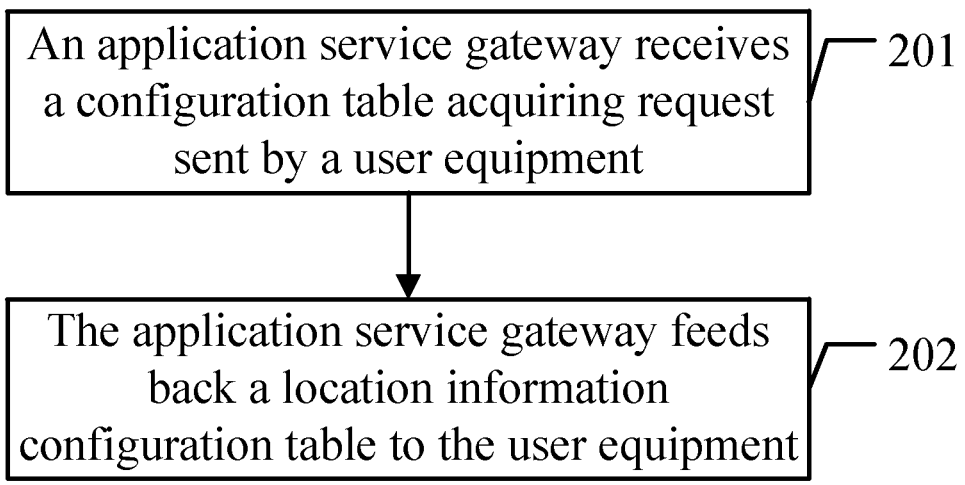
FIG. 2 is a schematic diagram of a location information notification method according to another embodiment of the present invention.

The foregoing describes an implementation process of a location information notification method according to an embodiment of the present invention from the perspective of a UE. Referring to implementation of the location information notification method according to the embodiment of the present invention from the perspective of the UE, the following describes an implementation process of a location information notification method of the present invention from the perspective of an ASG Referring to FIG. 2, a location information notification method according to another embodiment of the present invention includes:

201. An ASG receives a configuration table acquiring request sent by a UE.

In this embodiment, the ASG may receive the configuration table acquiring request sent by the UE, where the configuration table acquiring request is used to request the ASG to feed back a location information configuration table, and the location information configuration table may be used to indicate a camping location information range of a first network.

It should be noted that the UE in this embodiment may establish a communication connection with the ASG through various access devices, for example, the UE may establish the communication connection with the ASG through a base station or an access point (AP, Access Point). A specific networking structure is not limited herein.

202. The ASG feeds back the location information configuration table to the UE.

After receiving the configuration table acquiring request from the UE, the ASG may feed back a location information configuration table saved in the ASG to the UE. The first network in this embodiment may be a Femto network, and the location information configuration table is used to indicate a camping location information range of the Femto network.

In this embodiment, after receiving the configuration table acquiring request from the UE, the ASG may feed back the location information configuration table saved in the ASG to the UE, and then the UE may determine, according to a matching relationship between camping location information of the UE and the location information configuration table, a network on which it is located and send out corresponding prompt information.

Figure 3:
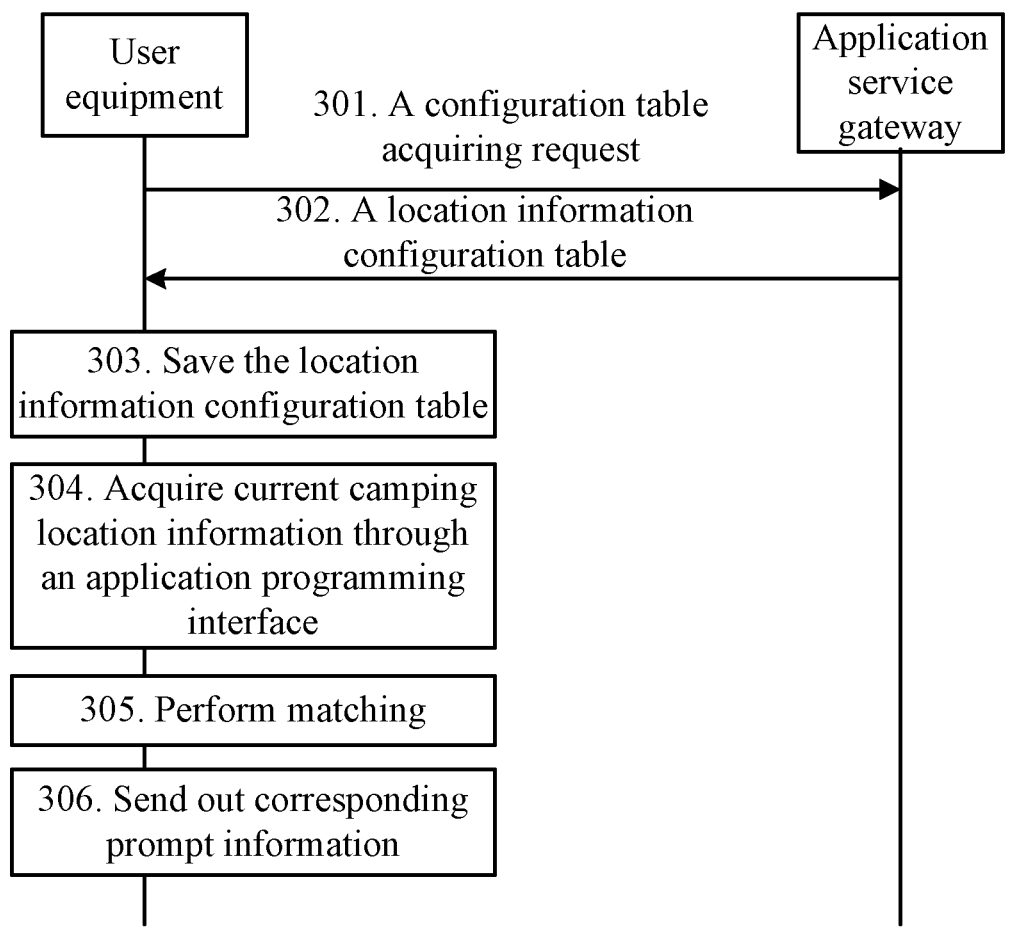
FIG. 3 is a schematic diagram of a location information notification method according to another embodiment of the present invention.

For ease of understanding, the following describes a location information notification method of the present invention from the perspective of an interaction between a UE and an ASG Referring to FIG. 3, a location information notification method according to another embodiment of the present invention includes:

301. A UE sends a configuration table acquiring request to an ASG

In this embodiment, after the UE starts up and loads a widget (Widget) or an application (Application) for a first time, the UE sends the configuration table acquiring request to the ASG so as to request acquiring of a location information configuration table.

302. The ASG feeds back the location information configuration table to the UE.

After receiving the request of the UE, the ASG feeds back a locally configured location information configuration table to the UE.

In this embodiment, a location information configuration table is maintained on the ASG, where the location information configuration table is used to indicate a location area code (LAC, Location Area Code) range of a Femto network, and the location information configuration table may be specifically as shown in table 1:

TABLE 1

| Femto | LAC Range |
|---|---|
| Femto1 | 0x0110-0x01EF |
| Femto2 | 0x2555-0x28A4 |
| Femto3 | 0x38D1-0x3993 |

The meaning indicated in table 1 is as follows: The Femto1 network includes areas corresponding to LACs ranging from 0x0110 to 0x01EF, the Femto2 network includes areas corresponding to LACs ranging from 0x2555 to 0x28A4, and the Femto3 network includes areas corresponding to LACs ranging from 0x38D1 to 0x3993.

Table 1 is only an example in this embodiment. It can be understood that in a practical application, specific content of the location information configuration table is not limited to the preceding data, and specific data is not limited herein.

This embodiment is described by using an example in which an LAC is used as camping location information. It can be understood that in a practical application, in addition to the LAC, another identifier may also be used as the camping location information, and this is not specifically limited herein.

It should be noted that one base station can be uniquely determined according to an LAC and a cell identity (CELLID). However, in a practical application, the LAC range of the Femto network is different from an LAC range of a macro network, and therefore the Femto network and the macro network can be distinguished simply by using the LAC in this embodiment.

303. The UE saves a received location information configuration table.

304. The UE acquires current camping location information through an API.

In this embodiment, whenever the UE accesses a network, the UE may acquire a current LAC of the UE itself from a core network according to a network protocol used by the accessed network and save the acquired LAC locally.

It should be noted that because one base station can be uniquely determined according to the LAC and the CELLID, when the UE accesses a network, in addition to acquiring the LAC, the UE may also acquire the CELLID and may save the acquired LAC and CELLID locally after the acquiring.

When a preset condition is met, the UE may locally acquire the current camping location information, that is, the LAC and the CELLID, of the UE through its own API.

It should be noted that meeting a preset condition in this embodiment may indicate that the UE needs to prompt a user with a current camping network or inform the user that a preset moment, a preset period, or the like is reached. This is not specifically limited herein.

In this embodiment, if the UE accesses a network and saves the current LAC and CELLID in an update manner, the UE may acquire the locally saved LAC and CELLID directly through the API. If the UE is capable of locally saving multiple LACs and CELLIDs, the UE may acquire an LAC and a CELLID that are recently saved locally through the API. A specific manner is not limited herein.

It should be noted that UEs with different operating systems may specifically use different types of APIs when acquiring camping location information from their local memories, but the acquiring manners are similar. The following takes the Windows Mobile operating system as an example for description.

Each time when a Windows Mobile terminal accesses a network to transmit data, the Windows Mobile terminal may acquire current camping location information of the Windows Mobile terminal, such as an LAC and a CELLID, from a core network by using a current communications protocol (such as the Wireless Application Protocol). The information is processed by a radio interface layer (RIL, Radio Interface Layer) function of the Windows Mobile operating system and saved in a memory of the Windows Mobile terminal.

When the Windows Mobile terminal needs to prompt a user with a current camping network, the Windows Mobile terminal may directly invoke an API of the RIL function, so as to acquire the previously saved LAC and CELLID, or the Windows Mobile terminal may use other software/functions to invoke the API of the RIL function, so as to acquire the previously saved LAC and CELLID. This is not specifically limited herein.

In addition to locally acquiring the current camping location information of the UE through the API, the UE may also acquire the current camping location information of the UE from other network-side devices through the API or is capable of acquiring the current camping location information of the UE through the API in another manner. This is not limited herein.

305. The UE performs matching.

After acquiring the current LAC of the UE, the UE may perform matching between the LAC and the acquired location information configuration table. A specific matching process may be as follows:

The UE determines whether the current LAC is in an LAC range of the Femto network in the location information configuration table; if yes, determines that the matching succeeds; and if no, determines that the matching fails.

In this embodiment, if the current LAC of the UE is 0x01D5, in the matching process, the UE detects that the LAC is in the "0x0110-0x01EF" range and determines that the matching succeeds.

In this embodiment, if the current LAC of the UE is 0x01FF, in the matching process, the UE detects that the LAC is not in any LAC range of the Femto network in table 1 and determines that the matching fails.

306. Send out corresponding prompt information according to a matching result.

In this embodiment, after the matching is completed, the UE may send out the corresponding prompt information according to the matching result, which may be specifically as follows:

If the current LAC of the UE successfully matches the preset location information configuration table, it indicates that the UE currently camps on the Femto network, and the UE may send out first prompt information, where the first prompt information is used to indicate that the UE currently camps on the Femto network.

Specifically, the UE may display the first prompt information at an operator logo on a screen of the UE, the first prompt information may pop up in a manner of a system message, or the UE may send out the first prompt information in a manner of a play announcement and the like. A specific manner is not limited.

If the current LAC of the UE fails to match the preset location information configuration table, it indicates that the UE currently camps on the macro network, and the UE may send out second prompt information, where the second prompt information is used to indicate that the UE currently camps on the macro network.

Specifically, the UE may display the second prompt information at an operator logo on the screen of the UE, the second prompt information may pop up in a manner of a system message, or the UE may send out the second prompt information in a manner of a play announcement and the like. A specific manner is not limited.

In this embodiment, the UE may provide an interface for the user to modify prompt information, and the user is capable of modifying specific content of the first prompt information or the second prompt information through this interface, so as to meet an individual demand.

For example, default content of the first prompt information is "Femto network", and default content of the second prompt information is "macro network". According to a demand of the user, the user may modify the content of the first prompt information to: "indoor network, tariff: XXXX" and modify the content of the second prompt information to: "outdoor network, tariff: XXXX".

In this embodiment, the UE sends the configuration table acquiring request to the ASG when the UE loads a Widget or an Application for the first time after starting up, so as to request acquiring of the location information configuration table. It can be understood that in a practical application, the UE is not limited to acquiring the location information configuration table from the ASG at this moment as long as the location information configuration table is acquired before step 305. A specific moment is not limited herein.

It should be noted that the UE may further acquire the location information configuration table again from the ASG according to an instruction of the user and use the newly acquired location information configuration table to update the originally saved location information configuration table, so as to improve precision of the matching process.

In this embodiment, a UE may acquire current camping location information of the UE through an API, and then the UE may determine, according to a matching relationship between the camping location information and a preset location information configuration table, a network on which it is located and send out corresponding prompt information. Almost all UEs having an operating system include an API, and currently, usage specifications and related standard protocols of the API are relatively mature. Therefore, a process of acquiring the camping location information through the API interface is relatively reliable, and various UEs are capable of accurately and effectively notifying a user of location information.

Secondly, the UE may dynamically acquire the current camping location information of the UE and may acquire the location information configuration table again from the ASG according to the user's instruction, so as to update the originally saved location information configuration table. In this way, the precision of the matching process can be improved, and the location information can be more accurately and effectively notified to the user.

Figure 4:
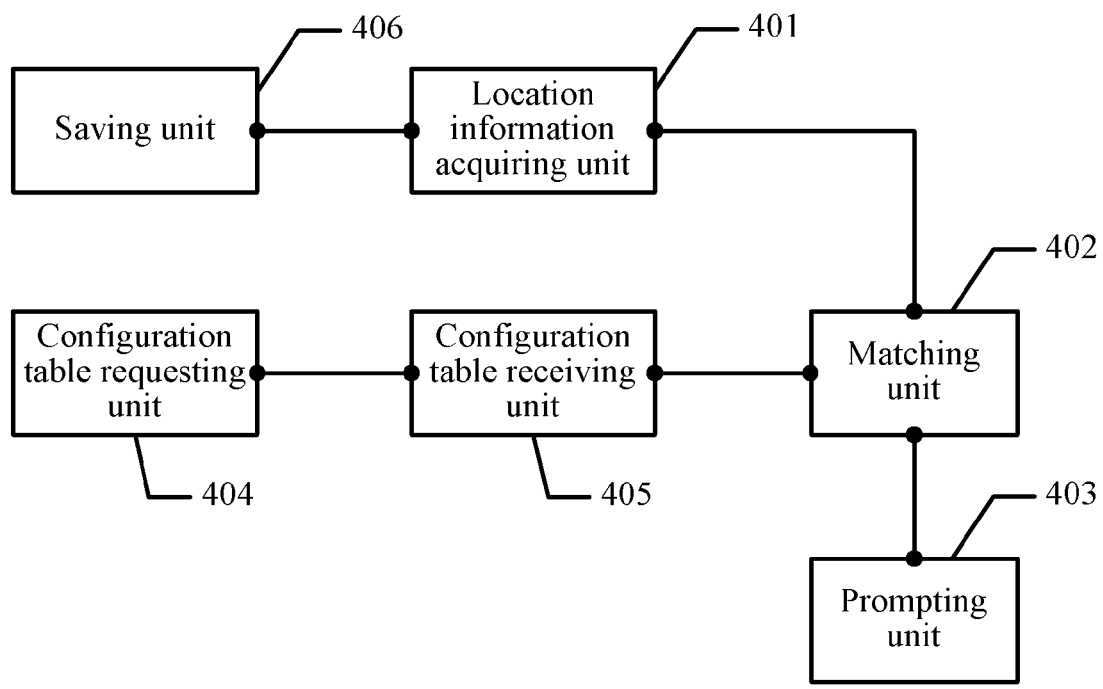
FIG. 4 is a schematic diagram of a user equipment according to an embodiment of the present invention.

Referring to implementation of the preceding method embodiment, the following describes a user equipment according to an embodiment of the present invention. Referring to FIG. 4, a user equipment according to an embodiment of the present invention includes:

a location information acquiring unit 401, configured to acquire current camping location information of the UE through an API;

a matching unit 402, configured to perform matching between the current camping location information of the UE obtained by the location information acquiring unit 401 and a preset location information configuration table; and a prompting unit 403, configured to send out corresponding prompt information according to a matching result obtained by the matching unit 402.

The user equipment in this embodiment may further include:

a saving unit 406, configured to, whenever the UE accesses a network, acquire a current location area code LAC of the UE according to a network protocol in use and save the LAC locally.

In this case, the location information acquiring unit 401 in this embodiment may locally acquire, through the API, current camping location information of the UE recently saved by the saving unit 406.

It should be noted that in addition to locally acquiring the current camping location information of the UE through the API, the location information acquiring unit 401 may also acquire the current camping location information of the UE from another network-side device through the API or acquire the current camping location information of the UE through the API in another manner. This is not limited herein.

The prompting unit 403 in this embodiment is specifically configured to, when the matching succeeds, send out first prompt information; and when the matching fails, send out second prompt information.

The first prompt information is used to indicate that the UE currently camps on a first network, and the second prompt information is used to indicate that the UE currently camps on a second network.

The user equipment in this embodiment may further include:

a configuration table requesting unit 404, configured to send a configuration table acquiring request to an ASG; and a configuration table receiving unit 405, configured to receive a location information configuration table fed back by the ASG, where the location information configuration table is used to indicate an LAC range of the first network.

For ease of description, the following describes communication relationships between the units of the user equipment in this embodiment by using a specific application scenario.

In this embodiment, when a preset condition is met, the location information acquiring unit 401 locally acquires the current LAC and a current CELLID of the UE through the API.

Meeting a preset condition in this embodiment may indicate that the UE needs to prompt a user with a current camping network or inform the user that a preset moment, a preset period, or the like is reached. This is not specifically limited herein.

After the location information acquiring unit 401 acquires the current LAC and CELLID of the UE, the matching unit 402 may perform matching between the LAC and the preset location information configuration table.

In this embodiment, the preset location information configuration table may be used to indicate the LAC range of the first network.

In this embodiment, the matching unit 402 may specifically determine whether the current LAC is in the LAC range of the Femto network in the location information configuration table shown in table 1; if yes, determine that the matching succeeds; and if no, determine that the matching fails.

After the matching unit 402 completes the matching, the prompting unit 403 may send out the corresponding prompt information according to the matching result, which may specifically be as follows:

If the matching succeeds, the prompting unit 403 sends out the first prompt information; and if the matching fails, the prompting unit 403 sends out the second prompt information.

The first prompt information is used to indicate that the UE currently camps on the first network, and the second prompt information is used to indicate that the UE currently camps on the second network.

In this embodiment, the location information acquiring unit 401 may acquire current camping location information of a UE through an API, then the matching unit 402 may determine, according to a matching relationship between the camping location information and a preset location information configuration table, a network on which the UE is located, and the prompting unit 403 may send out corresponding prompt information according to a matching result. Almost all UEs having an operating system include an API, and currently, usage specifications and related standard protocols of the API are relatively mature. Therefore, a process of acquiring the camping location information through the API interface is relatively reliable, and various UEs are capable of accurately and effectively notifying a user of location information.

Figure 5:
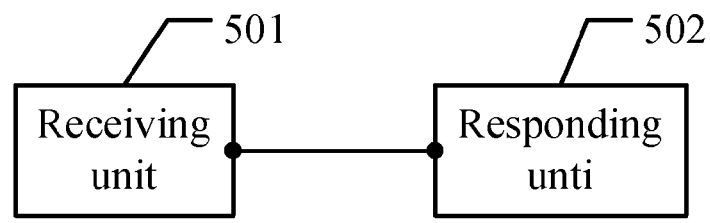
FIG. 5 is a schematic diagram of an application service gateway according to an embodiment of the present invention.

Referring to implementation of the preceding method embodiment, the following describes a user equipment according to an embodiment of the present invention. Referring to FIG. 5, an application service gateway according to an embodiment of the present invention includes:

a receiving unit 501, configured to receive a configuration table acquiring request sent by a UE; and a responding unit 502, configured to feed back a location information configuration table to the UE.

It should be noted that the UE in this embodiment may establish a communication connection with the ASG through various access devices, and a specific networking structure is not limited herein.

In this embodiment, a location information configuration table saved by the application service gateway may be as shown in table 1, and is not specifically described herein.

A person of ordinary skill in the art may understand that all or a part of the steps of the methods in the foregoing embodiments may be implemented by a program instructing relevant hardware. The program may be stored in a computer readable storage medium, such as a read-only memory, a magnetic disk, or an optical disc.

The above introduces a location information notification method, a user equipment, and an application service gateway that are provided in the present invention in detail. A person skilled in the art may make modifications to the specific implementation manners and application scopes according to the idea of embodiments of the present invention. Therefore, the content of this specification should not be construed as a limitation on the present invention.

What is claimed is:

1. A location information notification method, comprising:
acquiring, by a user equipment (UE), current camping location information of a network of the UE through an application programming interface (API);
performing, by the UE, matching between the current camping location information and information stored in a table of location information configuration indicating camping location information for one or more networks; and
notifying, by the UE, prompt information indicative of a network on which the UE currently camps according to a result of the matching.

2. The method according to claim 1, wherein the method further comprises:
whenever the UE accesses a network, acquiring, by the UE, a current location area code (LAC) of the UE according to a network protocol in use and saving the LAC locally; and
the acquiring, by the UE, the current camping location information of the UE through an API comprises:
when a condition is met, locally acquiring, by the UE, a recently saved LAC through the API.

3. The method according to claim 1, wherein the acquiring, by the UE, the current camping location information of the UE through an API comprises:
when a condition is met, acquiring, by the UE, a current location area code (LAC) of the UE from a network-side device through the API.

4. The method according to claim 1, wherein the notifying comprises:
notifying, by the UE, first prompt information if the matching succeeds; and notifying, by the UE, second prompt information if the matching fails, wherein:
the first prompt information is used to indicate that the UE currently camps on a first network, and the second prompt information is used to indicate that the UE currently camps on a second network.

5. The method according to claim 4, wherein before the performing, by the UE, the matching, the method comprising:
sending, by the UE, to an application service gateway (ASG), a request for the table of location information configuration; and
receiving, by the UE, the table fed back by the ASG, wherein the table is used to indicate a location area code (LAC) range of the first network for the matching with the current camping location information of the UE.

6. The method according to claim 4, wherein the first network is a Femto network, and the second network is a macro network; and
the performing, by the UE, the matching between the current camping location information and the table of location information configuration comprises:
determining, by the UE, whether the current LAC is in an LAC range of the Femto network; if yes, determining that the matching succeeds; and if no, determining that the matching fails.

7. A location information notification method for an application service gateway (ASG) configured to communicationally couple to a user equipment (UE), the method comprising:
receiving, by the ASG, a request, sent by the UE, for a table of location information configuration; and
feeding back, by the ASG, the table to the UE, wherein the table is used to indicate a camping location information range of a Femto network, to thereby cause the UE to perform a matching between a current camping location information of the UE and the camping location information range of the Femto network in the table and to notify prompt information indicative of a network on which the UE currently camps according to a result of the matching.

8. A user equipment (UE), comprising:
non-transitory computer readable storage medium to store program(s); and
computer hardware configured, including configured by the program(s), to:
acquire current camping location information of the UE through an application programming interface (API);
perform matching between the current camping location information and information stored in a table of location information configuration indicating camping location information for one or more networks; and
notify prompt information indicative of a network on which the UE currently camps according to a result of the matching.

9. The user equipment according to claim 8, wherein the computer hardware is further configured to, whenever the UE accesses a network, acquire a current location area code (LAC) of the UE according to a network protocol in use and save the LAC locally, wherein:
when a condition is met, locally acquire, through the API, an LAC recently saved.

10. The user equipment according to claim 8, wherein the computer hardware is further configured to, when a condition is met, acquire a current local area code (LAC) of the UE from a network-side device through the API.

11. The user equipment according to claim 8, wherein the computer hardware is further configured to, when the matching succeeds, notify first prompt information; and when the matching fails, notify second prompt information; and the first prompt information is used to indicate that the UE currently camps on a first network, and the second prompt information is used to indicate that the UE currently camps on a second network.

12. The user equipment according to claim 11, wherein the computer hardware is further configured to:
send to an application service gateway (ASG), a request for the table of location information configuration; and
receive the table fed back by the ASG, wherein the table is used to indicate a location area code (LAC) range of the first network for the matching with the current camping location information of the UE.

13. An application service gateway, comprising:
non-transitory computer readable storage medium to store program(s); and
computer hardware configured, including configured by the program(s), to:
receive an acquiring request sent by a user equipment (UE) for a table of location information configuration; and
feed back the table to the UE, wherein the table is used to indicate a camping location information range of a Femto network, to thereby cause the UE to perform a matching between a current camping location information of the UE and the camping location information range of the Femto network in the table and to notify prompt information indicative of a network on which the UE currently camps according to a result of the matching.

* * * * *